Jan. 17, 1967   U. M. GEISSLER ETAL   3,298,243
CABLES AND LOAD BEARING SUPPORTS THEREFOR
Filed June 26, 1964   2 Sheets-Sheet 1

INVENTORS
Ulrich M. Geissler
BY Vincent Polo

ATTORNEY

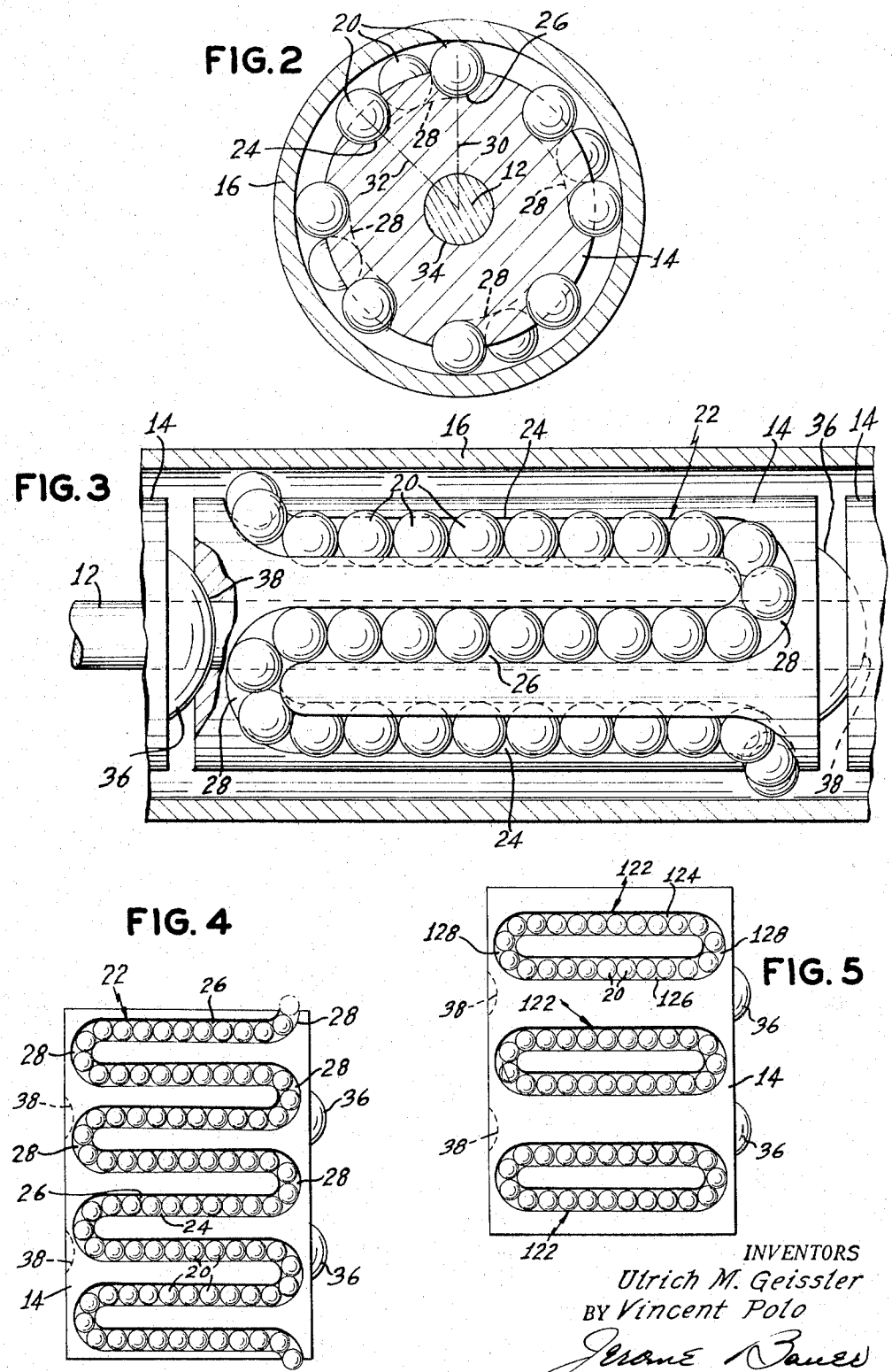

United States Patent Office 3,298,243
Patented Jan. 17, 1967

3,298,243
CABLES AND LOAD BEARING
SUPPORTS THEREFOR
Ulrich M. Geissler, 1401 SW. 5th Court, Freeport, N.Y. 11520, and Vincent Polo, 22 Parkway Drive, Baldwin, N.Y. 11510
Filed June 26, 1964, Ser. No. 378,322
10 Claims. (Cl. 74—501)

This invention relates to load bearing supports for use in a flexible cable and the like adapted for movement in a sleeve.

In mechanical remote controlled devices, it is usual to effect the control of a remotely located device or mechanism by the use of flexible cables that can be moved axially under tension and compression. Often it is necessary that the cables operate around the corner of irregular obstructions. In such cases, it is usual to house the cable in a sheath or sleeve to guide and restrict its movement along its desired path. This results in losses of power due to friction produced as the moving cables rub against the inner wall of the sheath. Additionally, backlash or lost motion is experienced as the cable must traverse the space between itself and the adjacent confining wall of the sheath before it can perform its functions. Backlash and lost motion movements defeath ability to utilize such cables as finite and accurate controls.

Accordingly, the desideratum of the invention is to overcome and provide a solution for the above mentioned problems by the provision of bearing supports that function with a minimum of frictional losses, obtaining the maximum linear or working movements with a minimum of application of tensile or compressive force.

Another object of the invention is to provide bearing supports that can be joined together to form a cable or that can be connected to a flexible cable to form a working part thereof.

A further object is the provision of a novel bearing support that includes a race of endless shape and in which load bearing members roll between load bearing and non-load bearing positions.

Still another object is to provide a bearing support that is simple in construction and efficient in operation and in which each load bearing member placed in a working or load bearing position in the race thereof performs an equal share of the work.

Figure 1:
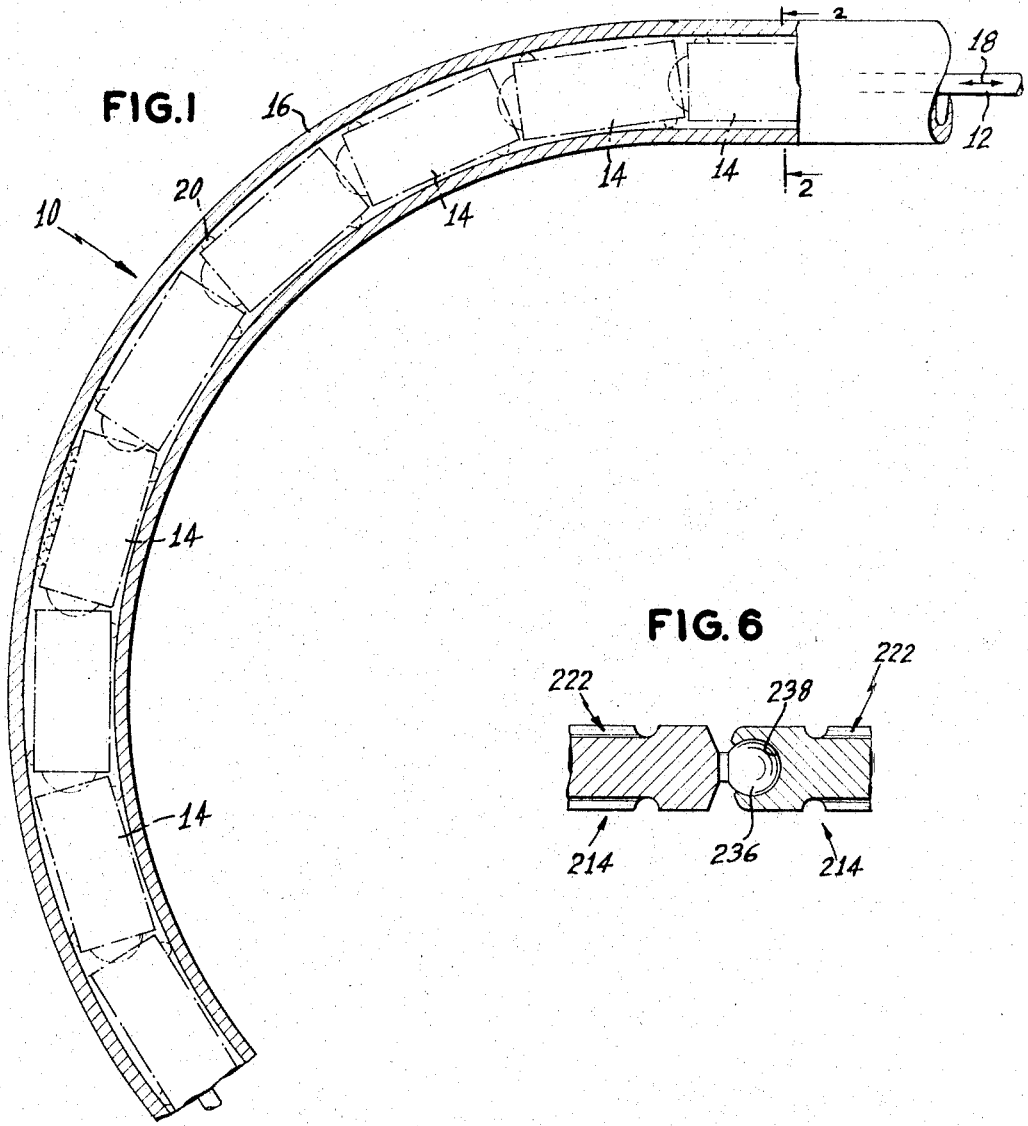
Figure 6:
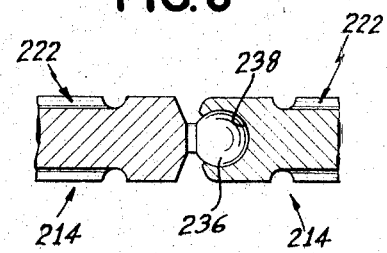
Figure 7:
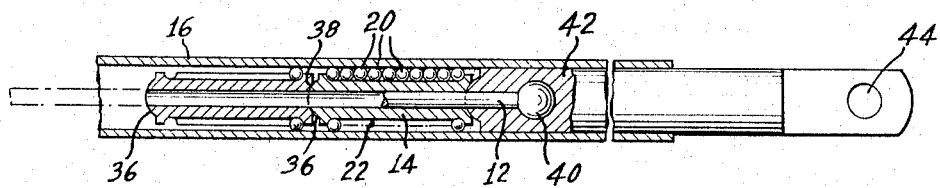

Other and further objects of this invention reside in the structures and arrangements hereinafter more fully described with reference to the accompanying drawings in which:

FIG. 1 is a partial cross section of a sheath housing a combined cable and load bearing support constructed according to the teaching of the invention, FIG. 2 is an enlarged cross section of FIG. 1 taken along lines 2—2, FIG. 3 is an enlarged view of a portion of FIG. 1 and illustrating a carrier member, FIG. 4 is a reduced scale development of the carrier member of FIG. 3, FIG. 5 is a development view of the carrier member with a modified race, FIG. 6 is a modification of the carrier member, and FIG. 7 is a partial view of the end of the combined cable and load bearing supports.

Referring now to FIG. 1 of the drawings, the numeral 10 generally identifies the structural combination of a cable 12 and a plurality of load bearing support members 14 housed within a sleeve or sheath bent to support the same for working movement about a corner or other obstructing configuration. The cable 12 may be of any flexible construction as is conventional in actuating cables. According to the teaching of the present invention, the cable extends through a plurality of load bearing support members or carriers 14. The sheath or sleeve housing the combined structure is identified by the numeral 16.

In the past, when the cable 12 was actuated in either direction under tension or compression as indicated by the double headed arrow 18, it was necessary for the same to move within the sheath 16 for a short distance of lost motion movement until such time as it abutted the surrounding housing wall of such sheath. Thereafter, by rubbing against the sheath wall and experiencing great frictional losses, the cable 12 was able to perform its work on whatever mechanism it may have been connected with. Such frictional losses required a greater application of forces than necessary to operate the cable 12 in order to enable it to perform its work. Moreover, the need for the cable 12 to move into abutting engagement with the surrounding wall of the sheath 16 resulted in lost motions that prevented its use as an intricate or finite control of the movements of the devices or mechanisms to which the same was connected. In the present invention, this problem is solved by the use of a plurality of individual support members or carriers 14 along a portion of the length of the cable 12 that is encased within the sheath 16.

The carriers 14 are each cylindrical shaped members whose length may be longer than their diameter as shown in the enlarged view of FIG. 1. The carriers 14 are adapted to be strung lengthwise along the cable 12 to space the same equally from the sheath 16 and to function as load bearing element supports to reduce lost movements and frictional losses by the support of a plurality of load bearing elements 20. The load bearing elements 20 may take the form of any kind of rollable structures. For convenience and clearer understanding, the drawings illustrate ball bearings. However, as the description proceeds, those skilled in the art will readily recognize that roller bearings will function equally as well. However, it has been found that the ball bearings 20 shown are well suited for the purposes of this invention.

The load bearing support members or carriers 14 each have a race defined on the circular surface thereof and generally identified by the numeral 22. In the drawings, the race 22 is displayed on the outer peripheral circular surface of each carrier member 14. It is clearly within the contemplation of the invention that the inventive details of the race may be formed equally as well on an interior circular surface of such carriers if the need should present itself. The race 22 (FIGS. 3 and 4) is comprised of a plurality of race portions. For ease of understanding, the race portions are here denoted as the idler or drone portion 24, the working or load bearing portion 26 and the interconnecting or feeder portion 28.

In practice, the idler or drone portion 24 and working or load bearing portion 26 of the race 22 are elongated in direction of the elongation of the carrier 14 and are alternately spaced about the circular surface or periphery of the carrier 14. Interconnecting the idler portion 24 with the working or load bearing portion 26 of the race 22 is the feeder or interconnecting race portion 28. In FIG. 3, the race 22 is shown to be of endless form extending spirally and in a number of turns completely about the circular surface of the periphery of the carrier 14.

The load bearing elements 20 are mounted within the race 22 in abutting relationship with each other so that as each load bearing element 20 rolls in the race 22, it abuts the next adjacent load bearing element to cause it to move and roll in the race. The load bearing elements 20 are all of the same size and shape. By this invention, it is possible to position the load bearing elements 20 such that only some of them are moved into actual working or load bearing relationship between the race 22 of the carrier 14 and the encompassing interior surface of the housing sleeve 16.

Referring now to FIG. 2, the cross sectional view thereof illustrates this feature of the invention. There, it is seen that the radical line 30 extending from the center of the circular surface of the carrier 14 is greater in length than the radial line 32. Thus, it will be noted that the depth of the race portion at the radial line 30 is less or shallower than the depth of the race portion at the radial line 32. The race portion defined at the greater radial distance 30 is that of the working or load bearing portion 26 of the race 22 whereas the deeper race portion 24 positioned at the lesser radial distance 30 from the center of the circular surface of the carrier member 14 is the idler or drone portion of the race 22.

Hence, load bearing elements 20 positioned in the working or load bearing portion 26 of the race 22 are raised into active working position to engage the interior surface of the housing sheath 16 for load bearing engagement therewith. On the other hand, the load bearing elements 20 positioned in the idler or drone portion 24 of the race 22 are removed radially from engagement with the interior surface of the sheath 16 and, therefore, are positioned out of load bearing engagement therewith. In consequence, the load bearing elements 20 in the idler race portion 24 are in non-load bearing position and are free to idle and perform no work. The interconnecting or feeder portion 28 of the race 22 varies in the depth of its recess in the periphery of the carrier member 14 and, therefore, in its radial distance from the center. The varying depth of the portion 28 serves as a ramp to connect the idler portion 24 with the next adjacent working portion 26 of the race 22 and to permit the load bearing elements 22 to roll and move between the portions 24 and 26 freely, unrestricted and unhampered.

In practice, where a flexible cable 12 is utilized to perform work in response to the application of tensile or compressive forces exerted thereon to move the same axially in the directions identified by the arrow 18, the same is bearingly supported in the sheath 16 by a string of the load bearing support members or carriers 14. To enable this, a plurality of carriers 14 each are provided with a central opening 34 extending for the lengths thereof to accommodate the cable therein. Each carrier 14 is strung and lined up with the other on the cable 12 and abuts the next adjacent carrier member at a swivel connection or engagement.

Referring to FIGS. 3 and 4, the swivel connection thereshown comprises a male protrusion 36 provided at one end of the carrier and a female recess 38 defined at the other end thereof. The engagement of the male 36 in the female recess 38 permits relative swiveling or hinging movement of the carriers 14 with respect to each other to conform to the curvature of any regularly or irregularly shaped housing sheath 16 such as shown in FIG. 1. The carrier members 14 may be retained fixed to the desired curved portion of the cable 12 in the manner shown in FIG. 7. There, the cable 12 is provided with an enlargement 40 that is secured in an extension arm 42 that may have the tensile or compressive forces applied thereto at its end 44.

Consequently, a force applied to the cable 12 at the end 44 of the arm 42 is transmitted along the length of the cable to the opposite end thereof and to the work performing mechanism or device to which the same may be connected. Thus, axial movement of the cable may be converted to perform any desired type of working movement at its opposite end. However, during the axial movement of the cable 12, it is snugly contained within the carriers 14 whose load bearing elements 20 accurately and constantly space the cable from the interior surface of the housing sheath 16. This prevents backlash or lost motion movement of the cable 12 within the sheath 16 and serves to guide the cable so that forces applied thereto at the end 44 are transmitted substantially undiminished along the length thereof to the opposite working end.

At the same time, frictional forces are substantially reduced and almost eliminated by the novel arrangement and structure of the carrier race 22 and the arrangement of the rollable elements 20 therein. That is to say, as an axial force is applied to the cable 12, the carriers 14 strung therealong, move with the cable. Certain of their captive load bearing elements 20 engage the adjacent interior surface of the housing sheath 16. These load bearing elements 20 are located in the shallow working or load bearing portion 26 of the race 22. Since there are a plurality of such working or load bearing portions 26 staggered angularly about the circular surface of the carrier 14, there are numerous points of load bearing contact between each carrier and the surrounding sheath surface. Additionally, these points of contact are divided between the number of load bearing elements 20 that engage the adjacent surface of the sheath 16 at any one time.

During the movement of the carriers 14 with the cable 12, the load bearing elements 20, engaging the adjacent surface of the sheath 16, are caused to roll as a result of their moving engagement with such sheath surface. As the elements 20 roll in and along the length of the working or load bearing portion 26 of the race, they abut each other and move, one by one, from such portion into the interconnecting or feeder portion 28 of the race. Because of their abutting and movement, they force the load bearing elements 20 into the interconnecting or feeder portion 28 located in the path of their movement. The chain-like, train reaction creates a flowing movement of elements 20 idling in the portion 24 to move up and feed along the opposite portion 28 then into the race portion 26. This endless cycling continues with and in response to the length of movement of the cable 12.

The unique flowing movement of load bearing elements 20 from the working or load bearing portion to the idler or drone portion 24 of the race 22 by way of the feeder portion 28 provides for a continuous exchange of bearing surfaces. It will be recognized that in this way no one load bearing element 20 ever performs all of the load bearing function. Rather, all of the load bearing elements positioned in the working portion 26 of the race will have the load equally divided between them. Moreover, as these elements 20 are moved into and out of load bearing position, they are relieved of the load bearing forces and, therefore, there is a constant exchange and relief of load bearing surfaces that move in the direction of the movement of the cable 12. This arrangement aids in reducing the frictional forces that would normally restrict the movement of such cable and reduces the possibility of damage to the load bearing elements 20.

The endless race 22 thus permits a guided chain-like, endless flow of load bearing elements that move in the direction of movement of the cable 12. The endless race 22 functions as a closed circuit wherein the load bearing elements 20 perform a self-feeding function to forcefully move themselves and to constantly change their position within the race so that none of the load bearing elements ever assume the constant and full load of the forces that are normally applied in conventional ball bearing structures. The movement of the elements 20 in the direction of movement of the cable 12 tends to aid and supplement the forces applied to the cable 12. In practice, the number of turns of the spirally formed race 22 has been found to be immaterial, except, however, that if there are at least three of such load bearing portions 26, these will serve to equally space the carrier 14 from the surrounding surface of the housing sheath 16.

In this connection, reference is now made to the development view of FIG. 5 wherein the carrier member 14 comprises a plurality of endless races each generally identified by the numeral 122. Here, instead of the spirally shaped race 22 as shown in FIGS. 2 to 4, the races 122 are elliptically shaped. However, once again, each set of elliptically shaped races 122 includes an idler or drone portion 124, a working or load bearing portion 126 and an interconnecting or feeder portion 128. Each of the portions 124, 126 and 128 correspond to the race portions 24, 26 and 28 of the carrier 14 previously described. The race portions function in the same manner as the similar or corresponding portions previously described. The rollable load bearing elements 20 forcefully move along the working or load bearing portion 126 of the race 122 and are positioned by the shallow race portion in load bearing or active working relationship with a surface, such as that of the sheath 16. When the elements 120 are positioned in the idler or drone portion 124 of the race 122, they are positioned in non-load bearing or inactive relationship with the sheath 16 and are then free to idle.

Here again, the idler portions 124 and working portions 126 are alternately spaced from each other about the circular surface or periphery of the carrier member 14 and arranged to assure load bearing support of the carrier member at a plurality of angularly spaced points about the same. The carrier member 14 of FIG. 5 is otherwise substantially the same as that shown in FIGS. 1 to 4 inclusive and may include a male protrusion 36 and a female recess 38 at its opposite ends to provide for hinging or pivotal moving engagement with the next adjacent carrier member contained in a line therewith. If desired, the carrier member 14 of FIG. 5 may have a central opening 34 to accommodate a flexible cable 12 so that each of the carrier members may be strung in chain-like relationship along such cable to function as an integral part thereof.

Those skilled in the art will readily recognize that the aforementioned description of the invention relates to the combination of a cable and a plurality of load bearing support members. It is within the contemplation of the invention, as found in practice, that a plurality of such load bearing support member or carriers 14 may be linked or connected together with each other to eliminate the passage of the cable therethrough. In this regard, reference is now made to the embodiment of FIG. 6 wherein the carriers there disclosed are generally identified by the numeral 214. The construction of the details of the races in such carriers may be in accordance with the disclosures set forth above. Hence, a repetition of such race details would be redundant and superfluous. For convenience and understanding, however, the races are identified by the numerals 222. It will be understood that abutting load bearing rollable elements, such as the elements 20 previously disclosed, will be contained therein.

In the present embodiment of FIG. 6, each carrier member 214 includes a ball like universal joint 236 extending from one end thereof. The opposite end of such carrier members has a recessed female engagement 238 that is adapted to receive the projection 236 therein. The connection and engagement afforded by the ball joint 236 and 238 provides a universal hinging movement that permits a plurality of the load support members 214 to be joined together for relative pivotal or hinging movement.

When such members are strung together in a chain-like relationship, they may be connected at the opposite ends to a cable 12 or any other moving mechanism. The string of universally joined (236, 238) support members 214 can flex and move relative to each other to conform to any curved configuration such as the sheath 16 illustrated in FIG. 1. The operation of the string or cable formed by the universally joined members 214 will function in the same manner as the members 14 previously described.

While there have been shown and described and pointed out the fundamental novel features of the invention as applied to several preferred embodiments thereof, it will be understood that various omissions and substitutions and changes in the form and details of the devices illustrated and in their operations may be made by those skilled in the art, without departing from the spirit of the invention. It is the intention, therefore, to be limited only as indicated by the scope of the claims appended hereto.

We claim:

1. The combination of a cable and load bearing support comprising a plurality of carriers engaging each other to form a line, each of said carriers having a race defined in the peripheral surface thereof, a plurality of rollable members in the race of each of said carriers, said race of each of said carriers having portions thereof into which said rollable members move between load bearing and non-load bearing positions, and a movable cable connected with said carriers to move the same therewith.

2. The combination of a flexible cable and load bearing support comprising an axially movable flexible cable, a plurality of individual carriers strung along said flexible cable for movement therewith, an endless race defined in each of said carriers, a plurality of members rollable in each of said races, portions of each of said races engageable by said rollable members to position the same in load bearing and non-load bearing positions during the rolling of said rollable members in said races.

3. In the combination of a flexible cable and load bearing support as in claim 2, said carriers each having a central opening defined therein, and said flexible cable extending through the central opening of each of said carriers.

4. The combination of a flexible cable and load bearing support as in claim 2, each of said carriers having a plurality of said endless races defined in the periphery thereof, and each of said races being elliptical in shape.

5. In the combination of a flexible cable and load bearing support as in claim 2, said endless race being spirally shaped.

6. In the combination of a flexible cable and load bearing support as in claim 2, said portion of said race to position the rollable members in load bearing position being shallower in depth than said portion to position the rollable members in non-load bearing position, and additional portions of said race interconnecting said non-load bearing and load bearing portions to enable the rollable members to roll from one of said race portions to the other.

7. A flexible cable of load bearing carriers comprising a plurality of individual carrier members strung in a line, means on each carrier member in the line engaging the next adjacent carrier member to string said carrier members together in line, said carrier members each having an endless race defined in a surface thereof, a plurality of members rollable in each of said races, and portions of each of said races positioning said rollable members in load bearing and non-load bearing positions during their rolling movement.

8. A flexible cable of load bearing carriers as in claim 7, a plurality of said endless races spaced about the periphery of each of said carrier members, said endless races each being elliptical in shape.

9. A flexible cable of load bearing carriers as in claim 7, said endless race of each carrier being formed in a spiral about the periphery thereof, said spiral races each having a plurality of said portions to position said load bearing members in load bearing and non-load bearing positions.

10. A load bearing support comprising a plurality of carriers; each of said plurality of carriers having a circular periphery, a race defined in said circular periphery, a plurality of load bearing members rollable in abutting engagement in said race, said race including an idler portion in which the load bearing members are in non-load bearing position, a working portion in which the load bearing members therein are in load bearing position, and portions interconnecting said idler and working portions to enable the load bearing members to roll therebetween, the radial distance of said working portion of said race from the center of the circular periphery being longer than that of said idler portion of said race; and a lengthwise cable joining said plurality of carriers in a string along a portion of the length thereof.

References Cited by the Examiner

UNITED STATES PATENTS

| | | | |
|---|---|---|---|
| 736,378 | 8/1903 | Gay | 64—2 |
| 2,457,910 | 1/1949 | McLaren et al. | 74—501 |
| 2,520,785 | 8/1950 | Schlicksupp | 308—6 |
| 2,559,292 | 7/1951 | Ferger | 308—6 |
| 2,576,269 | 11/1951 | Thomson | 308—6 |
| 2,681,836 | 6/1954 | Jarund | 308—6 |
| 3,042,459 | 7/1962 | Magg | 308—6 |
| 3,071,418 | 1/1963 | Hayes | 308—6 |

FOREIGN PATENTS

| | | |
|---|---|---|
| 1,328,454 | 4/1963 | France. |
| 336,347 | 10/1930 | Great Britain. |
| 514,771 | 11/1939 | Great Britain. |

FRED C. MATTERN, JR., *Primary Examiner.*

HALL C. COE, *Examiner.*